(12) United States Patent
Fraser

(10) Patent No.: US 12,404,193 B2
(45) Date of Patent: *Sep. 2, 2025

(54) FLOW THROUGH AEROBIC GRANULAR SLUDGE SYSTEM AND METHOD

(71) Applicant: Carollo Engineers, Inc., Costa Mesa, CA (US)

(72) Inventor: John Fraser, Arvada, CO (US)

(73) Assignee: Carollo Engineers, Inc., Costa Mesa, CA (US)

(*) Notice: Subject to any disclaimer, the term of this patent is extended or adjusted under 35 U.S.C. 154(b) by 463 days.

This patent is subject to a terminal disclaimer.

(21) Appl. No.: 17/599,682

(22) PCT Filed: Mar. 31, 2020

(86) PCT No.: PCT/US2020/025911
§ 371 (c)(1),
(2) Date: Sep. 29, 2021

(87) PCT Pub. No.: WO2020/205834
PCT Pub. Date: Oct. 8, 2020

(65) Prior Publication Data
US 2022/0194832 A1 Jun. 23, 2022

Related U.S. Application Data

(60) Provisional application No. 62/827,322, filed on Apr. 1, 2019.

(51) Int. Cl.
*C02F 3/30* (2023.01)
*C02F 1/00* (2023.01)
*C02F 3/12* (2023.01)

(52) U.S. Cl.
CPC ............. *C02F 3/301* (2013.01); *C02F 1/006* (2013.01); *C02F 3/1226* (2013.01); *C02F 2203/004* (2013.01); *C02F 2301/046* (2013.01)

(58) Field of Classification Search
CPC ........ C02F 3/301; C02F 1/006; C02F 3/1226; C02F 2203/004; C02F 2301/046; Y02W 10/10
(Continued)

(56) References Cited

U.S. PATENT DOCUMENTS 4,663,044 A 5/1987 Goronszy
5,480,548 A 1/1996 Daigger et al.
(Continued)

FOREIGN PATENT DOCUMENTS

CA 3074480 A1 3/2019
CN 105621615 A 6/2016
(Continued)

OTHER PUBLICATIONS

Katarzyna Chojnacka, Biosorption_and_bioaccumulation_-_NPL_-_2010.pdf (Year: 2010).*
(Continued)

*Primary Examiner* — Ekandra S. Miller-Cruz
(74) *Attorney, Agent, or Firm* — The Webb Law Firm

(57) ABSTRACT

A flow through aerobic granular sludge (AGS) system includes a flow through reactor. The flow through reactor includes a first adsorption zone and first and second unaerated and aerated zones and may include a wastewater distribution system and a selector zone. The first adsorption zone includes AGS granules and may include a mixing device. The first and second unaerated zones are under anaerobic, anoxic, or both anaerobic and anoxic conditions and each may include a mixing device. The first and second aerated zones are under aerobic conditions and each may include an aeration device. The flow through reactor is configured such that the wastewater and AGS granules in the first adsorption zone flow continuously from the first adsorption zone through the first unaerated zone, the first aerated (Continued)

zone, the second unaerated zone, the second aerated zone, and optionally to the selector zone and out of the flow through reactor.

5 Claims, 4 Drawing Sheets

(58) Field of Classification Search
USPC .................................................. 210/605
See application file for complete search history.

(56) References Cited

U.S. PATENT DOCUMENTS

| | | |
|---|---|---|
| 7,195,712 B2 | 3/2007 | Park et al. |
| 7,273,553 B2 | 9/2007 | Van Loosdrecht et al. |
| 8,017,014 B2 | 9/2011 | Yoon et al. |
| 8,747,671 B2 | 6/2014 | Giraldo et al. |
| 9,242,882 B2 | 1/2016 | Nyhuis et al. |
| 10,099,951 B2 | 10/2018 | Reilly et al. |
| 10,112,856 B2 | 10/2018 | Bott et al. |
| 10,590,018 B2 | 3/2020 | Miyake et al. |
| 2007/0158265 A1 | 7/2007 | Cote et al. |
| 2010/0264080 A1 | 10/2010 | Livingston et al. |
| 2013/0075327 A1 | 3/2013 | Yuan et al. |
| 2015/0376043 A1 | 12/2015 | Wett et al. |
| 2016/0137537 A1* | 5/2016 | Bott .................. B01D 21/2488 210/779 |
| 2017/0203984 A1 | 7/2017 | Lee et al. |
| 2018/0339925 A1 | 11/2018 | Miyake et al. |
| 2020/0002201 A1 | 1/2020 | Stinson et al. |
| 2021/0070642 A1 | 3/2021 | Fraser |

FOREIGN PATENT DOCUMENTS

| | | |
|---|---|---|
| EP | 3279154 A1 | 2/2018 |
| WO | 2019046416 A1 | 3/2019 |
| WO | 2020104944 A1 | 5/2020 |
| WO | 2020205834 A1 | 10/2020 |

OTHER PUBLICATIONS

Peng Yongzhen, Inverted A2/O step feed coupled aerobic particle sludge reinforced synchronous nitrification/denitrification dephosphorization device, 2016 (Year: 2016).*

* cited by examiner

FLOW THROUGH AEROBIC GRANULAR SLUDGE SYSTEM AND METHOD

CROSS REFERENCE TO RELATED APPLICATION

This application is United States national phase of International Application No. PCT/US2020/025911 filed Mar. 31, 2020, and claims priority to U.S. Provisional Patent Application No. 62/827,322, entitled "Flow Through Aerobic Granular Sludge System and Method." filed Apr. 1, 2019, the entire contents of which are herein incorporated by reference.

BACKGROUND

Technical Field

The present disclosure relates to wastewater treatment. More particularly, it relates to a flow through reactor for aerobic granular sludge (AGS) wastewater treatment processes, systems, and methods.

Technical Description

Aerobic granular sludge (AGS), also known as granular activated sludge (GAS), and sometimes included as a subset of ballasted activated sludge (BAS), is a wastewater treatment process for the removal of carbon, suspended solids, nitrogen, phosphorus, and other pollutants and trace contaminants from wastewater. An AGS process encourages the growth of spherical and dense granules of activated sludge biomass. AGS is formed through the creation of certain environmental and physical conditions within the reactor. The required physical and environmental conditions cause cell mass within the reactor to agglomerate around dense spherical granules naturally forming in symbiotic layering of selective bio populations to promote efficient biological conversion of pollutants. The density and sphericity of the AGS allows for improved settling and liquid solids separation compared to conventional activated sludge floc. The selective bio population layering provides efficient and symbiotic conversion of pollutants. Both factors allow a higher biomass inventory, or equivalent mixed liquor suspended solids (MLSS) concentration, within an activated sludge aeration basin reactor for treatment in a smaller basin volume and footprint.

The physical and environmental conditions typically required to support AGS include: creating a biomass "feast and famine" environment, exposure of the granules to feed wastewater in a manner that encourages rapid pollutant adsorption, creating appropriate cyclical aerated and unaerated conditions to select for certain biomass and remove certain pollutants, movement of granules within a water column through use of mixers, aeration, or gravity to encourage agglomeration of biomass to the granules and promote sphericity, a biomass selector mechanism which can consist of cyclones, sieves, stacked tray, plate or tube settlers etc. to retain larger heavier particles and granules and selectively waste lighter suspended biomass, and other conditions. The AGS granules can be removed through either a selector or known solid/liquid separation techniques to separate the granules from the liquid component. The lighter suspended biomass can be removed through a known solid/liquid separation technique using gravity clarification, high rate clarification, or membrane separation.

AGS processes are typically configured as a sequencing batch reactor (SBR). SBRs are comprised of one or more tanks in parallel that treat wastewater with a series, or sequences, of stages. In a typical AGS process in an SBR, these stages include, not necessarily in this order, a fill stage where the reactor is filled with wastewater sometimes through an upflow distribution network that encourages rapid pollutant adsorption to the granule (creating a feast cycle), multiple sequential react stages that may include aerated and unaerated sequences, where environmental conditions allow for selective pollutant removal (creating a famine cycle) and physical conditions cause the biofilm to agglomerate and segregate in layers around solid granules, a settle stage where the solid granules settle to the bottom of the SBR tank, and a decant stage where the liquid is separated from the solids. The decant stage is sometimes concurrent with the fill stage allowing the influent water to displace treated effluent out of the SBR reactor.

One known AGS process that uses an SBR configuration in the mainstream treatment process is called NEREDA also known as AQUA NEREDA. Another known AGS process using an SBR in a split stream or side stream configuration to promote AGS development and then seed the AGS into the mainstream conventional activated sludge reactor is called Organo. In both processes, AGS formulation occurs in an SBR and includes discrete fill, aerate, react, settle, and decant sequences.

The NEREDA and other mainstream AGS processes are sometimes configured to use multiple parallel SBRs and sequential feed and withdrawal. However, using multiple parallel SBRs is more complicated and expensive than the system that is the subject of this disclosure. The O-AGS process and other split stream or sidestream processes develop AGS in a sidestream reactor with the AGS granules seeded into a mainstream flow through reactor without further exposure to the feast and famine cycle, environmental or physical conditions, and selectors that must be present for continued sustenance of the AGS granules.

FIG. 1A illustrates the typical agglomeration of biomass in a conventional activated sludge process floc whereby the selective biomass is non-uniform, contain filamentous organisms, and the biological pollutant removal reactions are largely controlled by the external environmental conditions within multiple zones of a BNR aeration basin. FIG. 1B illustrates the agglomeration in an AGS process whereby the biomass selectively and symbiotically separates into layers around a hard granular center to form spherical particles, largely devoid of filamentous organisms. The biological pollutant removal reactions in an AGS are largely controlled by the environmental conditions within the granule and the environment immediately adjacent to the AGS granule surface. With respect to FIG. 1B, the outer layer is aerobic while the inner layer is anoxic, as indicated in the legend. In both FIG. 1A and FIG. 1B, "PAO" refers to phosphate accumulating organisms while "GAO" refers to glycogen accumulating organisms.

More AGS treatment plants currently exist in Europe than other regions of the world outside of the United Stated and Canada. Typical European AGS, SBR reactors are deep, e.g. 20 to 35 ft, cylindrical or rectangular above-ground tanks. This aeration basin tank configuration is not common at wastewater facilities in the United States and Canada. As such, use of AGS retrofits within existing conventional or biological nutrient removal (BNR) activated sludge aeration basins within the United States and Canada to achieve European AGS tank geometry and depth will be challenging. In the United States and Canada, for example, activated sludge basins have high plug flow, high length to width ratio, and are relatively shallow with a water depth in the range of about 15 to 20 ft. SBR rector configurations are less common than flow through aeration basins in the United States and Canada. SBR reactor configurations are more commonly used in small treatment facilities with capacity of less than 5 MGD.

At present, there is no known process or procedure to apply the concepts and required physical and environmental conditions of AGS outside of an SBR configuration. There is also no known mechanism to replicate the SBR cycles in a continuous flow through activated sludge basin configuration, such as the types of existing active sludge basins that are prevalent in the United States and Canada.

SUMMARY

In some non-limiting embodiments or aspects, a flow through aerobic granular sludge (AGS) system for treating wastewater includes a flow through reactor. The flow through reactor includes a first adsorption zone, wherein the first adsorption zone includes AGS granules; a first unaerated zone downstream of the first adsorption zone, wherein the first unaerated zone is under anaerobic, anoxic, or both anaerobic and anoxic conditions; a first aerated zone downstream of the first unaerated zone, wherein the first aerated zone is under aerobic conditions; a second unaerated zone downstream of the first aerated zone, wherein the second unaerated zone is under anaerobic, anoxic, or both anaerobic and anoxic conditions; and a second aerated zone downstream of the second unaerated zone, wherein the second aerated zone is under aerobic conditions. The flow through reactor is configured such that, in operation, the wastewater and AGS granules flow continuously from the first adsorption zone through the first unaerated zone, the first aerated zone, the second unaerated zone, and the second aerated zone.

In some non-limiting embodiments or aspects, the flow through reactor may include a wastewater distribution system configured to introduce the wastewater to at least the first adsorption zone. In some non-limiting embodiments or aspects, the wastewater distribution system may include at least one of an inlet pipe, a piping distribution network, an underdrain system, and a step feed channel. In some non-limiting embodiments or aspects, the flow through reactor may include a selector zone located downstream of the second aerated zone, the selector zone configured to remove the AGS granules from the wastewater; and a return AGS pumping system in communication with the selector zone, the return AGS pumping system configured to transport the AGS granules removed from the wastewater in the selector zone to the first adsorption zone. In some non-limiting embodiments or aspects, the selector zone may include at least one of: a stacked tray grit removal system, an aerated grit removal unit, a vortex-type grit removal unit, a plate or tube settler solids removal unit, or a cyclone-type grit removal unit. In some non-limiting embodiments or aspects, the selector zone may be configured to allow lighter biomass floc to pass through the selector zone and out of the flow through reactor.

In some non-limiting embodiments or aspects, each of the first adsorption zone, the first unaerated zone, and the second unaerated zone may include a mixing device configured to mix the wastewater and AGS granules contained therein. In some non-limiting embodiments or aspects, the mixing device may include at least one of a mechanical bladed mixer, an impeller mixer, a hydraulic mixer, and a large bubble mixer. In some non-limiting embodiments or aspects, the first and second aerated zones each may include an aeration device configured to introduce oxygen into the aerated zone. In some non-limiting embodiments or aspects, each aeration device may include at least one of a sparger aerator, a coarse bubble aeration system, a fine bubble aeration system, and a surface aeration system. In some non-limiting embodiments or aspects, the flow through reactor may include baffle walls separating each one of the zones from the zone or zones adjacent thereto.

In some non-limiting embodiments or aspects, a flow through aerobic granular sludge (AGS) system for treating wastewater includes a multi-pass flow through reactor. The multi-pass flow through reactor includes a first pass, a second pass downstream of the first pass, and a third pass downstream of the second pass, wherein each of the first pass, the second pass, and the third pass includes an adsorption zone, an unaerated zone downstream of the adsorption zone, and an aerated zone downstream of the unaerated zone, wherein at least the adsorption zone of the first pass includes AGS granules, and wherein the multi-pass flow through reactor is configured such that, in operation, the wastewater and AGS granules flow continuously from the first pass to the second pass and from the second pass to the third pass.

In some non-limiting embodiments or aspects, the multi-pass flow through reactor may include a wastewater distribution system configured to introduce wastewater to at least the adsorption zone of the first pass. In some non-limiting embodiments or aspects, the multi-pass flow through reactor may include a step feed channel configured to feed wastewater into the adsorption zone of each of the second pass and the third pass. In some non-limiting embodiments or aspects, the multi-pass flow through reactor may include a selector zone located downstream of the final pass, the selector zone configured to remove the AGS granules from the wastewater; and a return AGS pumping system in communication with the selector zone, the return AGS pumping system configured to transport the AGS granules removed from the wastewater in the selector zone to the adsorption zone of at least one of the first pass, the second pass, and the third pass. In some non-limiting embodiments or aspects, each of the first pass, the second pass, and the third pass may include a plurality of unaerated zones and a plurality of aerated zones.

In some non-limiting embodiments or aspects, a method of treating wastewater using a flow through aerobic granular sludge (AGS) reactor includes (a) introducing wastewater to an adsorption zone including AGS granules, wherein pollutants contained in the wastewater are absorbed into the AGS granules; (b) subsequent to step (a), distributing the wastewater and the AGS granules to a first unaerated zone downstream of the adsorption zone, wherein the first unaerated zone is under anaerobic, anoxic, or both anaerobic and anoxic conditions; (c) subsequent to step (b), distributing the wastewater and the AGS granules to a first aerated zone downstream of the first unaerated zone, wherein the first aerated zone is under aerobic conditions; (d) subsequent to step (c), distributing the wastewater and the AGS granules to a second unaerated zone downstream of the first aerated zone, wherein the second unaerated zone is under anaerobic, anoxic, or both anaerobic and anoxic conditions; and (e) subsequent to step (d), distributing the wastewater and the AGS granules to a second aerated zone downstream of the second unaerated zone, wherein the second aerated zone is under aerobic conditions, wherein the wastewater and the AGS granules in the first adsorption zone flow continuously from the first adsorption zone through the first unaerated zone, the first aerated zone, the second unaerated zone, and the second aerated zone.

In some non-limiting embodiments or aspects, the method of treating wastewater using a flow through aerobic granular sludge (AGS) reactor may include distributing the wastewater and at least a portion of the AGS granules to a selector zone located downstream of the second aerated zone. In some non-limiting embodiments or aspects, the method of treating wastewater using a flow through aerobic granular sludge (AGS) reactor may include, at the selector zone, removing the AGS granules from the wastewater; and returning the AGS granules removed from the wastewater to the first adsorption zone. In some non-limiting embodiments or aspects, the method of treating wastewater using a flow through aerobic granular sludge (AGS) reactor may include allowing lighter floc biomass to pass through the selector zone and out of the flow through reactor. In some non-limiting embodiments or aspects, the method of treating wastewater using a flow through aerobic granular sludge (AGS) reactor may include mixing the wastewater and the AGS granules with a mixing device in each of the adsorption zone, the first unaerated zone, and the second unaerated zone; and introducing oxygen to each of the first and second aerated zones with one or more aeration devices.

In some non-limiting embodiments or aspects, the method of treating wastewater using a flow through aerobic granular sludge (AGS) reactor, wherein the flow of the wastewater and the AGS granules may travel around baffle walls. In some non-limiting embodiments or aspects, the method of treating wastewater using a flow through aerobic granular sludge (AGS) reactor may include maintaining a substrate to microorganism ratio in the adsorption zone sufficient to cause rapid pollutant adsorption to the granules. In some non-limiting embodiments or aspects, the method of treating wastewater using a flow through aerobic granular sludge (AGS) reactor, wherein the AGS granules experience alternating phases of rapid pollutant adsorption feast and famine periods, where demand for substrate by the AGS granules is greater than supply during the famine periods.

In some non-limiting embodiments or aspects, a method of treating wastewater includes using a multi-pass flow through aerobic granular sludge (AGS) reactor, wherein the multi-pass flow through AGS reactor includes a first pass, a second pass downstream of the first pass, and a third pass downstream of the second pass, wherein each of the first pass, the second pass, and the third pass includes an adsorption zone, an unaerated zone downstream of the adsorption zone, and an aerated zone downstream of the unaerated zone, and wherein at least the adsorption zone of the first pass includes AGS granules. The method includes introducing wastewater to the adsorption zone of the first pass; and causing the wastewater and the AGS granules to continuously flow from the first pass to the second pass and from the second pass to the third pass.

In some non-limiting embodiments or aspects, the method of treating wastewater using a flow through aerobic granular sludge (AGS) reactor according may include introducing wastewater to the adsorption zone of the first pass through a wastewater distribution system. In some non-limiting embodiments or aspects, the method of treating wastewater using a flow through aerobic granular sludge (AGS) reactor may include introducing wastewater into the adsorption zone in each of the second pass and third pass through a step feed channel. In some non-limiting embodiments or aspects, the method of treating wastewater using a flow through aerobic granular sludge (AGS) reactor, wherein introducing wastewater into the adsorption zone in each of the second pass and third pass may include a step feed operation in which the amount of wastewater fed into each adsorption zone is variable.

In some non-limiting embodiments or aspects, the method of treating wastewater using a flow through aerobic granular sludge (AGS) reactor, wherein the step feed operation may include introducing an amount of wastewater into the adsorption zone of the second pass that varies from the amount of wastewater introduced into the adsorption zone of the first pass; and introducing an amount of wastewater into the adsorption zone of the third pass that varies from the amount of wastewater introduced into the adsorption zone of the second pass. In some non-limiting embodiments or aspects, the method of treating wastewater using a flow through aerobic granular sludge (AGS) reactor may include distributing the wastewater and at least a portion of the AGS granules to a selector zone located downstream of the final pass. In some non-limiting embodiments or aspects, the method of treating wastewater using a flow through aerobic granular sludge (AGS) reactor may include, at the selector zone, removing the AGS granules from the wastewater; and returning the AGS granules removed from the wastewater to the first adsorption zone.

In some non-limiting embodiments or aspects, the method of treating wastewater using a flow through aerobic granular sludge (AGS) reactor may include removing allowing lighter floc biomass to pass through the selector zone and out of the flow through reactor. In some non-limiting embodiments or aspects, the method of treating wastewater using a flow through aerobic granular sludge (AGS) reactor may include mixing the wastewater and AGS granules with a mixing device in each adsorption zone of the first pass, the second pass, and the third pass; and introducing oxygen to each aeration zone of the first pass, the second pass, and the third pass with one or more aeration devices. In some non-limiting embodiments or aspects, the method of treating wastewater using a flow through aerobic granular sludge (AGS) reactor, wherein the flow of the wastewater and the AGS granules may travel around baffle walls. In some non-limiting embodiments or aspects, the method of treating wastewater using a flow through aerobic granular sludge (AGS) reactor, wherein each of the first pass, the second pass, and the third pass may include a plurality of unaerated zones and a plurality of aerated zones.

Further non-limiting embodiments or aspects of the present disclosure are set forth in the following numbered clauses.

Clause 1: A flow through aerobic granular sludge (AGS) system for treating wastewater, the system comprising: a flow through reactor, comprising: a first adsorption zone, wherein the first adsorption zone includes AGS granules; a first unaerated zone downstream of the first adsorption zone, wherein the first unaerated zone is under anaerobic, anoxic, or both anaerobic and anoxic conditions; a first aerated zone downstream of the first unaerated zone, wherein the first aerated zone is under aerobic conditions; a second unaerated zone downstream of the first aerated zone, wherein the second unaerated zone is under anaerobic, anoxic, or both anaerobic and anoxic conditions; and a second aerated zone downstream of the second unaerated zone, wherein the second aerated zone is under aerobic conditions, wherein the flow through reactor is configured such that, in operation, the wastewater and AGS granules flow continuously from the first adsorption zone through the first unaerated zone, the first aerated zone, the second unaerated zone, and the second aerated zone.

Clause 2: The flow through aerobic granular sludge (AGS) system for treating wastewater of Clause 1, wherein the flow through reactor further comprises: a wastewater distribution system configured to introduce the wastewater to at least the first adsorption zone.

Clause 3: The flow through aerobic granular sludge (AGS) system for treating wastewater of Clause 1 or 2, wherein the wastewater distribution system comprises at least one of an inlet pipe, a piping distribution network, an underdrain system, and a step feed channel.

Clause 4: The flow through aerobic granular sludge (AGS) system for treating wastewater of any of Clauses 1-3, wherein the flow through reactor further comprises: a selector zone located downstream of the second aerated zone, the selector zone configured to remove the AGS granules from the wastewater; and a return AGS pumping system in communication with the selector zone, the return AGS pumping system configured to transport the AGS granules removed from the wastewater in the selector zone to the first adsorption zone.

Clause 5: The flow through aerobic granular sludge (AGS) system for treating wastewater of any of Clauses 1-4, wherein the selector zone comprises at least one of: a stacked tray grit removal system, an aerated grit removal unit, a vortex-type grit removal unit, a plate or tube settler solids removal unit, or a cyclone-type grit removal unit.

Clause 6: The flow through aerobic granular sludge (AGS) system for treating wastewater of any of Clauses 1-5, wherein the selector zone is configured to allow lighter biomass floc to pass through the selector zone and out of the flow through reactor.

Clause 7: The flow through aerobic granular sludge (AGS) system for treating wastewater of any of Clauses 1-6, wherein each of the first adsorption zone, the first unaerated zone, and the second unaerated zone comprises: a mixing device configured to mix the wastewater and AGS granules contained therein.

Clause 8: The flow through aerobic granular sludge (AGS) system for treating wastewater of any of Clauses 1-7, wherein the mixing device comprises at least one of a mechanical bladed mixer, an impeller mixer, a hydraulic mixer, and a large bubble mixer.

Clause 9: The flow through aerobic granular sludge (AGS) system for treating wastewater of any of Clauses 1-8, wherein the first and second aerated zones each comprises: an aeration device configured to introduce oxygen into the aerated zone.

Clause 10: The flow through aerobic granular sludge (AGS) system for treating wastewater of any of Clauses 1-9, wherein each aeration device comprises at least one of a sparger aerator, a coarse bubble aeration system, a fine bubble aeration system, and a surface aeration system.

Clause 11: The flow through aerobic granular sludge (AGS) system for treating wastewater of any of Clauses 1-10, wherein the flow through reactor further comprises: baffle walls separating each one of the zones from the zone or zones adjacent thereto.

Clause 12: A flow through aerobic granular sludge (AGS) system for treating wastewater comprising: a multi-pass flow through reactor comprising a first pass, a second pass downstream of the first pass, and a third pass downstream of the second pass, wherein each of the first pass, the second pass, and the third pass comprises an adsorption zone, an unaerated zone downstream of the adsorption zone, and an aerated zone downstream of the unaerated zone, wherein at least the adsorption zone of the first pass includes AGS granules, and wherein the multi-pass flow through reactor is configured such that, in operation, the wastewater and AGS granules flow continuously from the first pass to the second pass and from the second pass to the third pass.

Clause 13: The flow through aerobic granular sludge (AGS) system for treating wastewater of Clause 12, wherein the multi-pass flow through reactor further comprises: a wastewater distribution system configured to introduce wastewater to at least the adsorption zone of the first pass.

Clause 14: The flow through aerobic granular sludge (AGS) system for treating wastewater of Clause 12 or 13, wherein the multi-pass flow through reactor further comprises: a step feed channel configured to feed wastewater into the adsorption zone of each of the second pass and the third pass.

Clause 15: The flow through aerobic granular sludge (AGS) system for treating wastewater of any of Clauses 12-14, wherein the multi-pass flow through reactor further comprises: a selector zone located downstream of the final pass, the selector zone configured to remove the AGS granules from the wastewater; and a return AGS pumping system in communication with the selector zone, the return AGS pumping system configured to transport the AGS granules removed from the wastewater in the selector zone to the adsorption zone of at least one of the first pass, the second pass, and the third pass.

Clause 16: The flow through aerobic granular sludge (AGS) system for treating wastewater of any of Clauses 12-15, wherein each of the first pass, the second pass, and the third pass comprises a plurality of unaerated zones and a plurality of aerated zones.

Clause 17: A method of treating wastewater using a flow through aerobic granular sludge (AGS) reactor, the method comprising: (a) introducing wastewater to an adsorption zone including AGS granules, wherein pollutants contained in the wastewater are absorbed into the AGS granules; (b) subsequent to step (a), distributing the wastewater and the AGS granules to a first unaerated zone downstream of the adsorption zone, wherein the first unaerated zone is under anaerobic, anoxic, or both anaerobic and anoxic conditions; (c) subsequent to step (b), distributing the wastewater and the AGS granules to a first aerated zone downstream of the first unaerated zone, wherein the first aerated zone is under aerobic conditions; (d) subsequent to step (c), distributing the wastewater and the AGS granules to a second unaerated zone downstream of the first aerated zone, wherein the second unaerated zone is under anaerobic, anoxic, or both anaerobic and anoxic conditions; and (e) subsequent to step (d), distributing the wastewater and the AGS granules to a second aerated zone downstream of the second unaerated zone, wherein the second aerated zone is under aerobic conditions, wherein the wastewater and the AGS granules in the first adsorption zone flow continuously from the first adsorption zone through the first unaerated zone, the first aerated zone, the second unaerated zone, and the second aerated zone.

Clause 18: The method of treating wastewater using a flow through aerobic granular sludge (AGS) reactor according to Clause 17, further comprising: distributing the wastewater and at least a portion of the AGS granules to a selector zone located downstream of the second aerated zone.

Clause 19: The method of treating wastewater using a flow through aerobic granular sludge (AGS) reactor according to Clause 17 or 18, further comprising: at the selector zone, removing the AGS granules from the wastewater; and returning the AGS granules removed from the wastewater to the first adsorption zone.

Clause 20: The method of treating wastewater using a flow through aerobic granular sludge (AGS) reactor according to any of Clauses 17-19, further comprising: allowing lighter floc biomass to pass through the selector zone and out of the flow through reactor.

Clause 21: The method of treating wastewater using a flow through aerobic granular sludge (AGS) reactor according to any of Clauses 17-20, further comprising: mixing the wastewater and the AGS granules with a mixing device in each of the adsorption zone, the first unaerated zone, and the second unaerated zone; and introducing oxygen to each of the first and second aerated zones with one or more aeration devices.

Clause 22: The method of treating wastewater using a flow through aerobic granular sludge (AGS) reactor according to any of Clauses 17-21, wherein the flow of the wastewater and the AGS granules travels around baffle walls.

Clause 23: The method of treating wastewater using a flow through aerobic granular sludge (AGS) reactor according to any of Clauses 17-22, further comprising: maintaining a substrate to microorganism ratio in the adsorption zone sufficient to cause rapid pollutant adsorption to the granules.

Clause 24: The method of treating wastewater using a flow through aerobic granular sludge (AGS) reactor according to any of Clauses 17-23, wherein the AGS granules experience alternating phases of rapid pollutant adsorption feast and famine periods, where demand for substrate by the AGS granules is greater than supply during the famine periods.

Clause 25: A method of treating wastewater using a multi-pass flow through aerobic granular sludge (AGS) reactor, wherein the multi-pass flow through AGS reactor comprises a first pass, a second pass downstream of the first pass, and a third pass downstream of the second pass, wherein each of the first pass, the second pass, and the third pass comprises an adsorption zone, an unaerated zone downstream of the adsorption zone, and an aerated zone downstream of the unaerated zone, and wherein at least the adsorption zone of the first pass includes AGS granules, the method comprising: introducing wastewater to the adsorption zone of the first pass; and causing the wastewater and the AGS granules to continuously flow from the first pass to the second pass and from the second pass to the third pass.

Clause 26: The method of treating wastewater using a flow through aerobic granular sludge (AGS) reactor according to Clause 25, further comprising: introducing wastewater to the adsorption zone of the first pass through a wastewater distribution system.

Clause 27: The method of treating wastewater using a flow through aerobic granular sludge (AGS) reactor according to Clause 25 or 26, further comprising: introducing wastewater into the adsorption zone in each of the second pass and third pass through a step feed channel.

Clause 28: The method of treating wastewater using a flow through aerobic granular sludge (AGS) reactor according to any of Clauses 25-27, wherein introducing wastewater into the adsorption zone in each of the second pass and third pass includes a step feed operation in which the amount of wastewater fed into each adsorption zone is variable.

Clause 29: The method of treating wastewater using a flow through aerobic granular sludge (AGS) reactor according to any of Clauses 25-28, wherein the step feed operation comprises: introducing an amount of wastewater into the adsorption zone of the second pass that varies from the amount of wastewater introduced into the adsorption zone of the first pass; and introducing an amount of wastewater into the adsorption zone of the third pass that varies from the amount of wastewater introduced into the adsorption zone of the second pass.

Clause 30: The method of treating wastewater using a flow through aerobic granular sludge (AGS) reactor according to any of Clauses 25-29, further comprising: distributing the wastewater and at least a portion of the AGS granules to a selector zone located downstream of the final pass.

Clause 31: The method of treating wastewater using a flow through aerobic granular sludge (AGS) reactor according to any of Clauses 25-30, further comprising: at the selector zone, removing the AGS granules from the wastewater; and returning the AGS granules removed from the wastewater to the first adsorption zone.

Clause 32: The method of treating wastewater using a flow through aerobic granular sludge (AGS) reactor according to any of Clauses 25-31, further comprising: allowing lighter floc biomass to pass through the selector zone and out of the flow through reactor Clause 33: The method of treating wastewater using a flow through aerobic granular sludge (AGS) reactor according to any of Clauses 25-32, further comprising: mixing the wastewater and AGS granules with a mixing device in each adsorption zone of the first pass, the second pass, and the third pass; and introducing oxygen to each aeration zone of the first pass, the second pass, and the third pass with one or more aeration devices.

Clause 34: The method of treating wastewater using a flow through aerobic granular sludge (AGS) reactor according to any of Clauses 25-33, wherein the flow of the wastewater and the AGS granules travels around baffle walls.

Clause 35: The method of treating wastewater using a flow through aerobic granular sludge (AGS) reactor according to any of Clauses 25-34, wherein each of the first pass, the second pass, and the third pass includes a plurality of unaerated zones and a plurality of aerated zones.

DETAILED DESCRIPTION

Figure 1B:
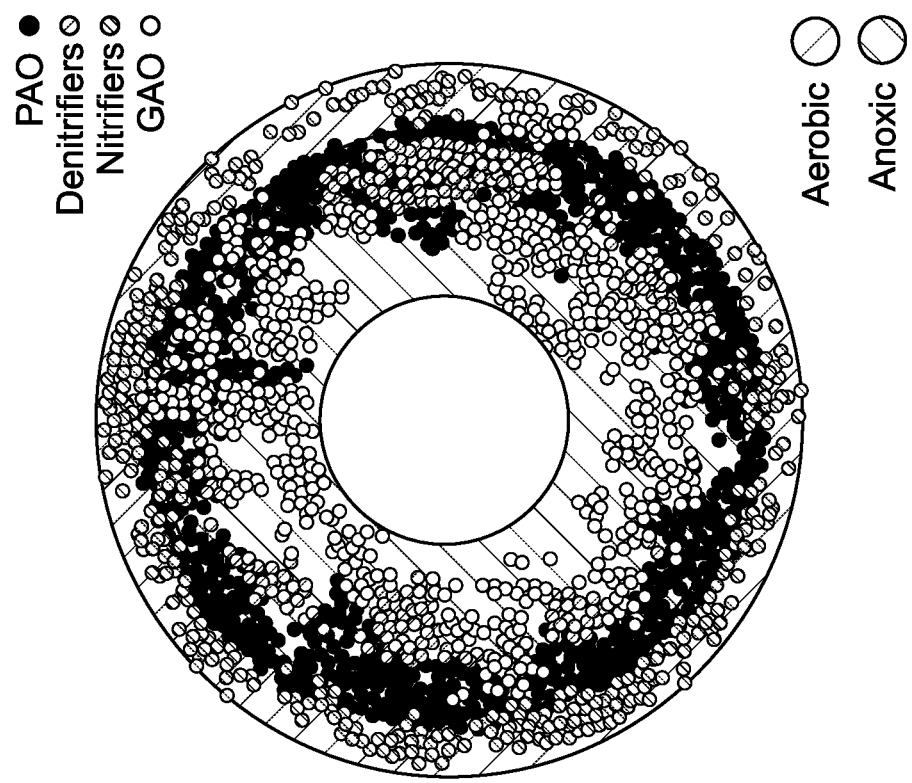
FIG. 1B is a view of an exemplary agglomeration in an aerobic granular sludge (AGS) process whereby the biomass selectively and symbiotically separates into layers around a hard granular center to form spherical particles, largely devoid of filamentous organisms.
Figure 1A:
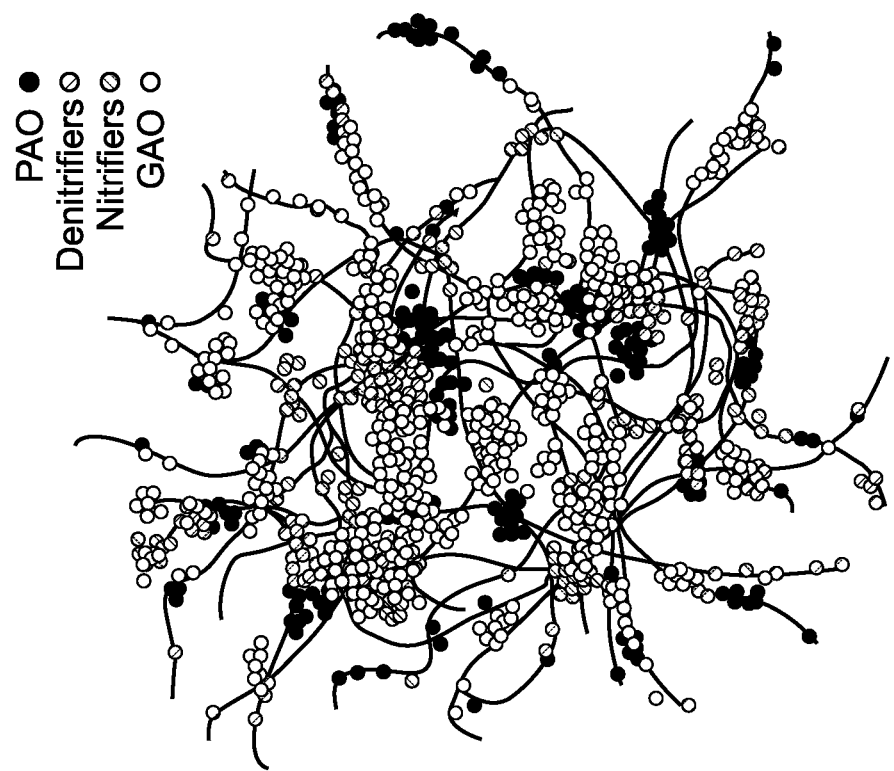
FIG. 1A is a view of an exemplary agglomeration of biomass in a conventional activated sludge process floc whereby the selective biomass is non-uniform, contain filamentous organisms, and the biological pollutant removal reactions are largely controlled by the external environmental conditions within multiple zones of a BNR aeration basin.

For purposes of the description hereinafter, spatial orientation terms shall relate to some non-limiting embodiments or aspects as they are oriented in the drawing figures.

However, it is to be understood that some non-limiting embodiments or aspects of this disclosure may assume alternative variations and step sequences, except where expressly specified to the contrary. It is also to be understood that the specific devices and processes illustrated in the attached drawings, and described in the following specification, are simply exemplary. Hence, specific dimensions and other physical characteristics related to some non-limiting embodiments or aspects disclosed herein are not to be considered as limiting.

As used in the specification, the singular form of "a", "an", and "the" include plural referents unless the context clearly dictates otherwise.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used in the claims or the specification, the language "at least one of X, Y, and Z" means "only X, only Y, or only Z; at least one of X and at least one of Y, at least one of X and at least one of Z, or at least one of Y and at least one of Z; or at least one of X and at least one of Y and at least one of Z."

All documents, such as but not limited to issued patents and patent applications, referred to herein, and unless otherwise indicated, are to be considered to be "incorporated by reference" in their entirety.

Provided is a system and method for treating wastewater using an AGS process in a non-SBR flow through (continuous flow) reactor. The system and method are designed to provide the required environmental and physical conditions that promote and preserve AGS formation in a flow through reactor configuration consistent with an SBR AGS reactor. The system and method can utilize reactor zone environmental control, rapid adsorption kinetics, alternating and appropriately sized aerated and unaerated zones, mechanical mixers, aeration control valves, selector systems to retain large agglomerated granules and waste lighter suspended floc designed to promote the growth of an AGS granule as it passes through a flow through reactor configuration. The system and method of this disclosure can be implemented using existing activated sludge aeration basin designs, thereby providing an alternative to the use of SBRs to perform AGS treatment.

Rapid adsorption of pollutants including nutrients and BOD uptake into the granules can be accomplished through uniform feed of raw wastewater or primary effluent wastewater into an initial adsorption zone of the reactor. The adsorption zone includes a high concentration of AGS granules returned from the selector. Uniform feed and adsorption into the granules can include introduction of wastewater through a bottom distribution grid of piping or underdrain or other feed mechanism that promotes adsorptive contact of raw wastewater with granules. The adsorption zone may be unaerated, aerated, or both. If the adsorption zone is unaerated, periodic on/off cyclical mixing using any mixing device including, for example, mechanical bladed mixers, impeller mixers, hydraulic mixers, or large bubble mixers may or may not be incorporated. If the adsorption zone is aerated, periodic on/off cyclical aeration using, for example, sparger/mixers, coarse bubble aeration, fine bubble aeration, or surface aeration may be used. The adsorption zone includes a period of time where the biomass is exposed to a high substrate to microorganism ratio (i.e., the "feast" period) which can be followed by multiple subsequent zones where the biomass consumes the substrate to the point where the demand for substrate is greater than the supply (i.e., the "famine" period). This "feast and famine" sequence conditions the biomass to go through a rapid adsorption phase during subsequent feast and famine sequences, and particularly when the biomass is next exposed to the feed substrate, thereby providing additional rapid adsorption of pollutants including nutrients and soluble BOD uptake into the granules. Multiple adsorption zones and alternating aerated and unaerated zones can be incorporated into a single flow through reactor to promote continuous development and maintenance of AGS granules.

Appropriately timed sequencing cycles for aerated aerobic conditions and mixed or unmixed unaerated anaerobic/anoxic conditions allow physical conditions for the granule to be built up through the formation of layers of biomass on top of one another. The required environmental conditions within the reactor zones allow the biomass to segregate into symbiotic layers of biomass that provide further environmental conditions and pollutant breakdown internal to the AGS granule to promote efficient treatment. In a reactor, the AGS granules start out small and less dense. The granules can be moved up and down through each reactor zone water column and, through this movement, the granules can collect other biomass that is suspended in the column and bring this additional biomass into the granule, thereby increasing the size and density of the granule. Granules become a stable size and sphericity over time with repeated exposure to the required physical and environmental conditions. Stable sized AGS granules allow improved liquid/solids separation (e.g., settling) and compaction during the settle cycles in unmixed unaerated zones and selector zones. Dense and spherical particles allow a higher equivalent mixed liquor concentration typically 2 to 4 times greater than conventional and BNR activated sludge, thereby reducing the reactor volume and footprint required for treatment, or conversely allowing higher flows to be treated in existing aeration basin volume and footprint.

The flow through AGS process also allows for liquid/solids separation and selection for denser granules within a selector zone. In particular, the liquid and lighter biomass floc that has not been incorporated into a granule may pass through the flow through reactor whereas the heavier more dense solids (granules) are retained in the reactor. Light biomass floc particles, such as particles that do not tend to agglomerate, are washed out of the reactor and can flow to existing or new downstream liquids/solids separation processes such as conventional gravity based secondary or final clarifiers, high rate clarifiers, grit removal technologies, filtration systems including, for example, media filtration, cloth filtration, or membrane filtration, while granules can be retained in the reactor and returned to the initial or subsequent adsorption zones. This granule selection process further creates a highly specialized, better settleable, higher concentration, aerobic granular sludge.

The flow through reactor system of the present disclosure can provide the required physical and environmental conditions necessary to develop and sustain AGS similar to AGS development in an SBR. The flow through reactor system can include one or more adsorption zones that each provide an environment in which the granules contact the influent wastewater to promote rapid adsorption of pollutants including nutrients and soluble BOD uptake into the granules in a "feast" mode with a high substrate to microorganism ratio. The flow through reactor system can also create zone environment alterations with fixed volumes that cycle from an aerated aerobic environment to an unaerated anaerobic/anoxic environment to subsequent aerobic and anaerobic/anoxic zones all of which are appropriately sized to provide the proper exposure times to each of the required physical and environmental conditions. The flow through reactor system can be configured with mixers in each adsorption and unaerated zone that can be turned on and off according to a controlled schedule. Cycling the mixers on and off can create a movement of the granules through the water column in the zones, allowing the granules to build upon themselves and densify by collecting biomass that is suspended in the water column. The flow through reactor system can include a selector zone located at or near the end of the reactor system, as well as a return AGS pumping system (RAGS PS) for moving the selected heavier granules from the selector back to the initial or subsequent adsorption zones. The lighter floc biomass exits the flow through reactor system and is conveyed to either existing or new external liquids/solids separation processes prior to additional treatment, if required, and ultimately to discharge or reuse.

For example, some non-limiting embodiments or aspects of the AGS selector process incorporate any process normally associated with removal of heavy material from raw wastewater, including sand and grit, to serve as a selector. Some non-limiting embodiments or aspects of grit removal technology used as a selector include a stacked tray grit removal system known as a HeadCell into the selector zones. The HeadCell serves as a selector to separate and retain the granules and allow light floc material that has not been absorbed into a granule to escape the reactor. Through this separation process, the reactor can concentrate heavy granules for return to the adsorption zones. Other non-limiting grit removal technologies that can serve as a selector in a flow through AGS system include, for example, aerated grit removal units, vortex type grit removal units, plate or tube settler type solids removal units, and cyclone type grit removal units. Available removal systems include those described in PCT Publication No. WO 2019/046416, filed Aug. 29, 2018 and entitled "Ballasted Activated Sludge Treatment Combined with High-Rate Liquids/Solids Separation Systems," the contents of which are herein incorporated by reference in their entirety.

Figure 2:
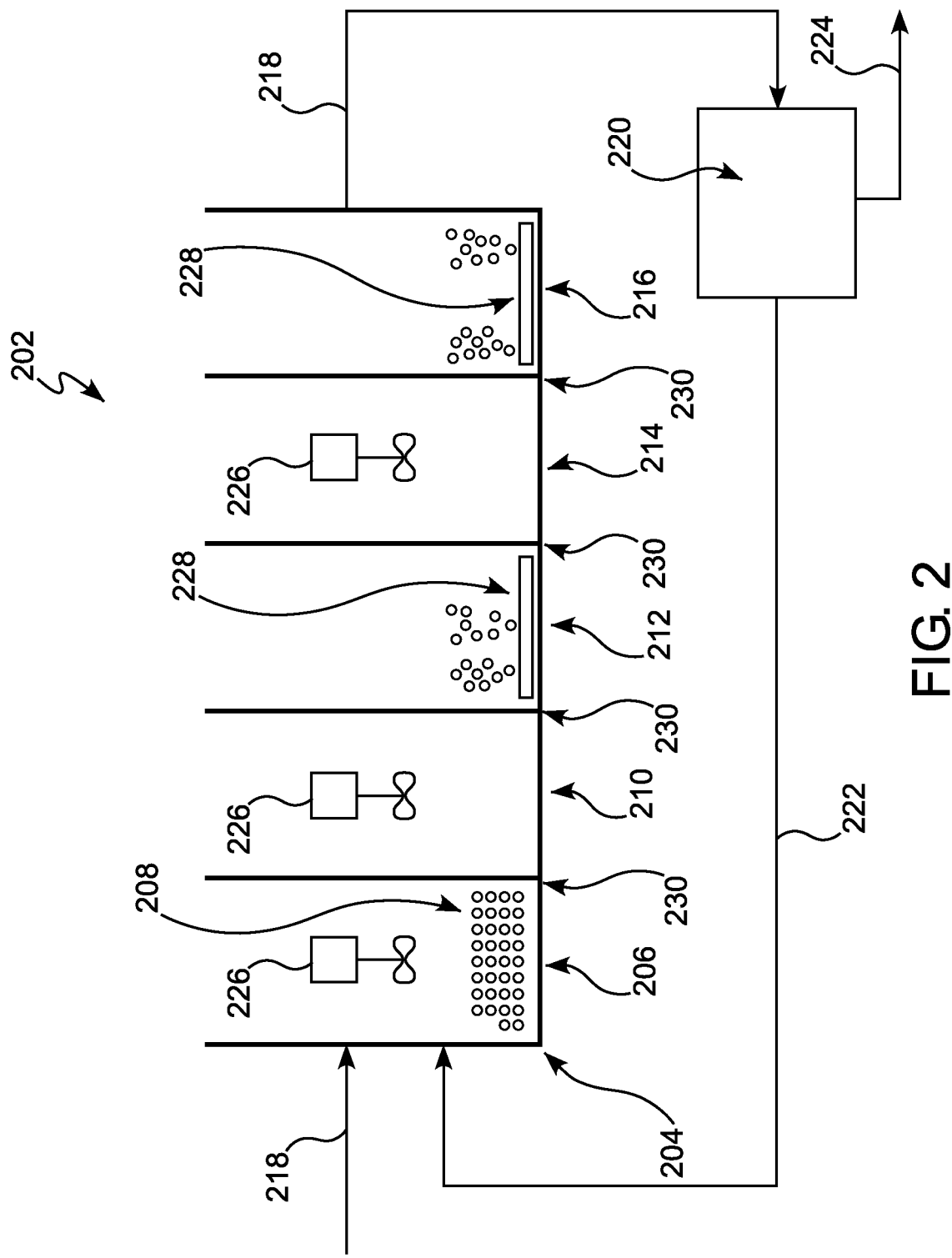
FIG. 2 is a view of a flow through aerobic granular sludge (AGS) system for treating wastewater according to some non-limiting embodiments or aspects of this disclosure.

Referring to FIG. 2, there is shown some non-limiting embodiments or aspects of a flow through aerobic granular sludge (AGS) system 202 for treating wastewater incorporated into an existing or a new flow through reactor 204. A first adsorption zone 206 of the flow through reactor 204 of the system 202 can include AGS granules 208. The AGS granules 208 can be returned to the first adsorption zone 206 from a selector zone 220 and exposed to wastewater in a manner that promotes rapid adsorption of pollutants, including nutrients and soluble BOD uptake into the AGS granules 208. A mixing device 226 can be turned on or off to suspend the AGS granules 208 in the wastewater or allow the granules to settle at the bottom of the first adsorption zone 206 of the flow through reactor 204 for improved adsorption. Wastewater having a high pollutant, nutrient, and/or BOD content can be introduced into at least the first adsorption zone 206 through a wastewater distribution system 218. The wastewater distribution system 218 may include an inlet pipe, a piping distribution network, an underdrain system at the bottom of the adsorption zone, a step feed channel, or other wastewater feed apparatuses or methods that promote rapid pollutant adsorption into the AGS granules 208. As the wastewater comes into contact with the AGS granules 208, pollutants are adsorbed into the AGS granules 208. This represents the "feast" stage of the required "feast and famine" cycle referenced above. Once BOD is adsorbed, it begins to penetrate through the AGS granules 208 where it is converted and used by the biomass in the different layers of the individual AGS granules 208. Each layer of the individual AGS granules 208 can change the character of the nutrients and make the nutrients usable as a substrate for the next layer of biomass that is deeper in the individual AGS granules 208. This process continues deeper and deeper into the individual AGS granules 208, starting with aerobic conditions on the outside of the individual AGS granules 208 and proceeding into anoxic and then anaerobic conditions as penetration into the individual AGS granules 208 continues.

The wastewater distribution system 218 can create even distribution of raw wastewater through the settled AGS granules 208. The even distribution of raw wastewater can be accomplished by using an inlet pipe, a piping distribution network, an underdrain system at the bottom of the first adsorption zone 206, a step feed channel, or other wastewater feed apparatuses or methods. The inlet pipe, piping distribution network, underdrain system at the bottom of the first adsorption zone 206, or step feed channel can receive the influent wastewater from a wastewater feed pipe or channel and can create an even distribution of wastewater at the bottom of the reactor evenly distributed across the entire bottom surface of the reactor, thereby creating complete contact of wastewater with the AGS granules 208. In a typical SBR, this adsorption cycle is generally unaerated and the mixing and aeration is turned off so that granules are settled to the bottom of the reactor. However, in some non-limiting embodiments or aspects shown in FIG. 2, a mixing device 226 within the first adsorption zone 206 can be turned off and on periodically. Operating the mixing device 226 during the adsorption period allows the granules and wastewater in the first adsorption zone 206 to move on to, or be distributed to, the next reactor zone, which in some non-limiting embodiments or aspects are shown as a first unaerated zone 210, and subsequently continuously flow through the entire flow through reactor 204 of the system 202. In some non-limiting embodiments or aspects shown in FIG. 2, a mixing device 226 within the first unaerated zone 210 can be turned off and on periodically. Flow of wastewater and granules between zones can occur when, for example, the wastewater and granules flow underneath, around, or over the top of the baffle walls 230 separating each zone, or through openings in the baffle walls 230.

As mentioned above, some non-limiting embodiments or aspects of the flow through reactor 204 of the system 202 shown in FIG. 2 are intended to provide the required physical and environmental conditions for development and maintenance of AGS granules 208 similar to the cycles of an SBR. The first adsorption zone 206 is followed by a first unaerated zone 210 that is located downstream of the first adsorption zone 206. A first aerated zone 212 is located downstream of the first unaerated zone 210. A second unaerated zone 214 is located downstream of the first aerated zone 212. A second aerated zone 216 downstream of the second unaerated zone 214. The first unaerated zone 210 and the second unaerated zone 214 are under anaerobic, anoxic, or both anaerobic and anoxic conditions. The first unaerated zone 210 and the second unaerated zone 214 can include a mixing device 226 that can be turned off and on periodically. The first aerated zone 212 and the second aerated zone 216 are under aerobic conditions. The sequence of the first adsorption zone 206, the first unaerated zone 210, the first aerated zone 212, the second unaerated zone 214, and the second aerated zone 216 depletes the substrate creating the "famine" stage of the "feast and famine" cycle referenced above. The sizes of each zone can be modified and refined to allow for appropriate cycle times under each of the required physical and environmental conditions. For example, the second aerated zone 216 at the end of the flow through reactor 204 can be larger to create a longer aerated cycle time to ensure that the remaining substrate is used by the bacteria causing the bacteria to enter the "famine" stage due to the absence of remaining substrate to consume. Causing the bacteria to enter the "famine" stage helps promote AGS granules 208 with specialized layers of bacteria. In addition, while FIG. 2 illustrates two aerated zones and two unaerated zones, the reactor 204 may include more than two aerated zones and more than two unaerated zones, such as three of each zone, four of each zone, or more than four of each zone, where the unaerated and aerated zones may alternate. The reactor 204 may additionally include more than one adsorption zone.

As mentioned above, the first adsorption zone 206 can be outfitted with a mixing device 226. The type of mixing device 226 is not limited to any particular embodiments or aspects. Possible mixing device 226 configurations include mechanical bladed mixers, impeller mixers, hydraulic mixers, large bubble mixers, or any other form of mixer that is typically used for mixing of zones in a BNR aeration basin. The first unaerated zone 210 and the second unaerated zone 214 can also include a mixing device 226, and each mixing device 226 could be operated in an on/off cycle or could run continuously. Each mixing device 226 can suspend the AGS granules 208 within the wastewater so the AGS granules 208 can flow to the next zone and can create an up and down movement within the water column of the zone wherein the AGS granules 208 can attract and retain floc and build the dense and highly spherical shape.

The flow through reactor 204 of the system 202 can include the first aerated zone 212 and the second aerated zone 216. The first aerated zone 212 and the second aerated zone 216 can be configured like standard aerobic zones that would be found in any activated sludge or biological nutrient removal (BNR) system. The first aerated zone 212 and the second aerated zone 216 can use any known type of aeration device 228 commonly used in those systems, including, for example, a sparger aerator, a coarse bubble aeration system, a fine bubble aeration system, or a surface aeration system. Each aeration device 228 or feed valve to aeration grids may be capable of cycling on and off or it may run continuously. There may be a benefit in cycling the air on and off to create additional transient anoxia conditions.

The flow through reactor 204 of the system 202 can include a selector zone 220, which could utilize a high-rate heavy solids removal and/or high rate clarification (such as through the use of HeadCells) as described in PCT Publication No. WO 2019/046416, which is incorporated herein by reference, or other grit or solids removal system(s), positioned downstream of the second aerated zone 216 that can allow heavy particles to settle out and lighter particles to continue on downstream either to an existing or new clarifier (e.g., circular, rectangular, high rate, or other type of clarifier) or filtration system (e.g., cloth filter, multimedia filter, membrane, or other type of filter). Other grit removal systems include stacked tray grit removal systems, aerated grit removal units, vortex type grit removal units, plate or tube settler solids removal units, or cyclone type grit removal units. In some non-limiting embodiments or aspects, heavier granules can be recovered and passed through a return AGS pumping system 222, where they can be added back into the first adsorption zone 206. AGS granules 208 can be returned to the first adsorption zone 206 by, for example, dispensing the AGS granules 208 into the inlet wastewater stream that is fed into first adsorption zone 206 (as depicted in FIG. 2) or AGS granules 208 can be returned to the first adsorption zone 206 by feeding AGS granules 208 from AGS pumping system 222 directly into first adsorption zone 206. The recovery process can involve allowing the heavier granules to drop onto trays, transferring them to a center column, and then pumping them out of the underflow portion of the center column through the return AGS pumping system 222. The selector zone 220 can be configured to allow lighter biomass floc to pass through the selector zone 220 and out of the flow through reactor 204. For example, the liquid and lighter biomass floc that has not been incorporated into a granule may be removed from the reactor, whereas the heavier more dense solids, such as AGS granules 208, can be retained in the reactor. Lighter floc biomass particles, such as particles that do not tend to agglomerate, are washed out of the reactor and can flow to existing or new downstream liquids/solids separation processes such as conventional secondary or final clarifiers, high rate clarifiers, grit removal technologies, filtration systems including, for example, media filtration, cloth filtration, or membrane filtration through treated wastewater stream 224, while AGS granules 208 can be retained in the reactor and returned to the initial or subsequent adsorption zones. Alternatively, selector zone 220 can separate lighter biomass floc from the liquid phase so that treated wastewater stream 224 contains only limited amounts of the lighter biomass floc.

The flow through reactor 204 of the system 202 can include baffle walls 230 separating each zone. The baffle walls 230 can be constructed of any suitable material and are commonly concrete, wood, fiberglass, steel, or fabric curtains, etc. In addition, alternating aerated and unaerated zones can also be created without hard baffle walls by alternating zones with aeration grids and without aeration grids, or by turning aeration on and off in alternating aeration grids within a single zone. In FIG. 2, the flow through reactor 204 of the system 202 includes four baffle walls 230 separating each zone. The number, placement, and orientation of the baffle walls 230 are not limited to those shown in some non-limiting embodiments or aspects and fewer or more baffle walls could be utilized in the flow through reactor 204 of the system 202. The addition of baffle walls 230 could allow for more zones to provide additional aerated and unaerated sequences.

Figure 3:
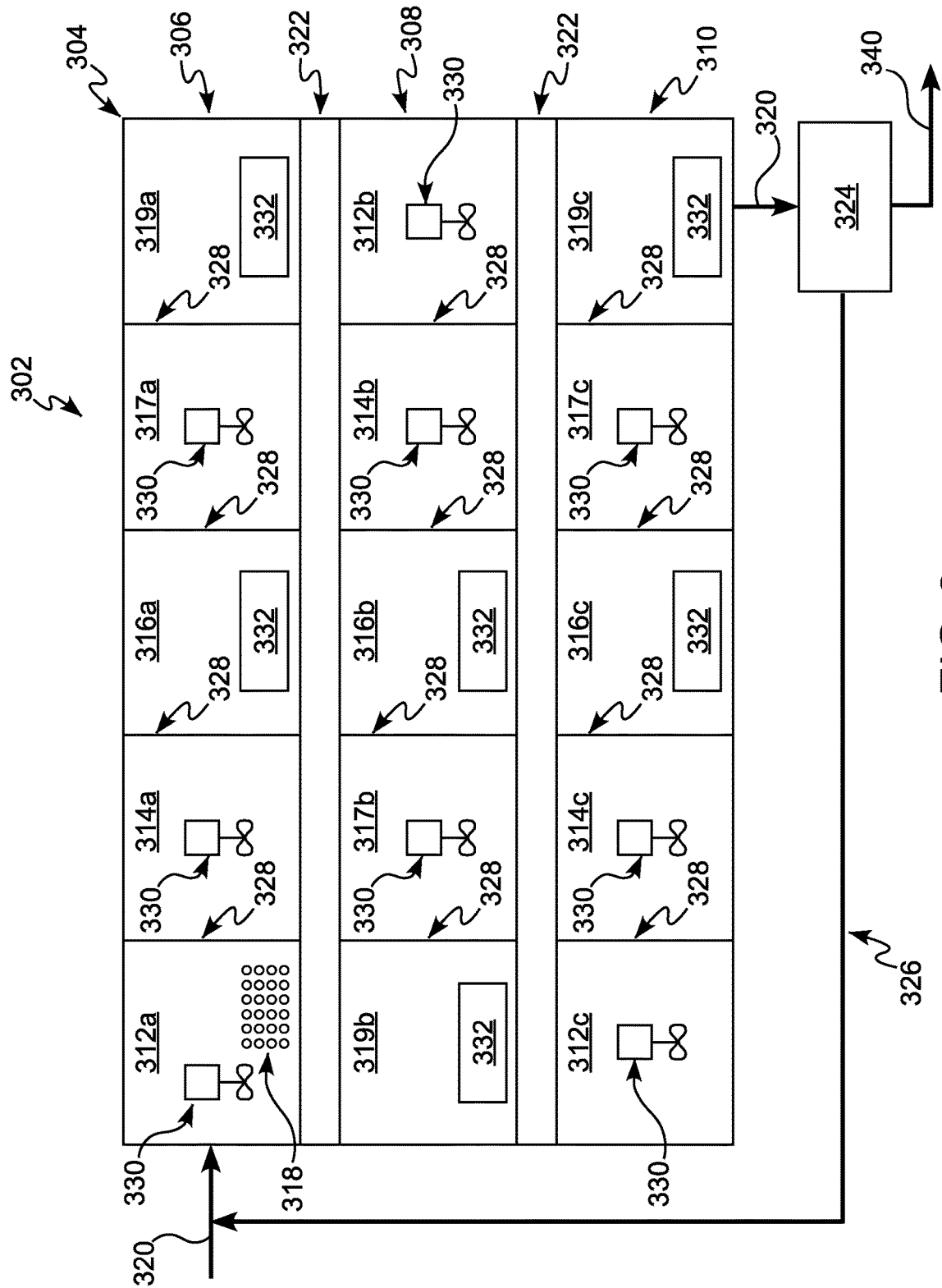
FIG. 3 is a view of a flow through aerobic granular sludge (AGS) system for treating wastewater according to some non-limiting embodiments or aspects of this disclosure.

Referring to FIG. 3, there is shown some non-limiting embodiments or aspects of a flow through aerobic granular sludge (AGS) system 302 for treating wastewater incorporated into an existing or a new multi-pass flow through reactor 304. The system and method for treating wastewater of the multi-pass flow through reactor 304 of the system 302 can be incorporated into other multiple pass aeration basin configurations. In a first pass 306 of some non-limiting embodiments or aspects, the multi-pass flow through reactor 304 of the system 302, which can be converted from conventional CAS or BNR to AGS, includes an adsorption zone 312*a*, a first unaerated zone 314*a* downstream of the adsorption zone 312*a*, a first aerated zone 316*a* downstream of the first unaerated zone 314*a*, a second unaerated zone 317*a* downstream of the first aerated zone 316*a*, and a second aerated zone 319*a* downstream of the second unaerated zone 317*a*. In a second pass 308 of some non-limiting embodiments or aspects, the multi-pass flow through reactor 304 of the system 302 also includes an adsorption zone 312b, a first unaerated zone 314b downstream of the adsorption zone 312b, a first aerated zone 316b downstream of the first unaerated zone 314b, a second unaerated zone 317b downstream of the first aerated zone 316b, and a second aerated zone 319b downstream of the second unaerated zone 317b. In a third pass 310 of some non-limiting embodiments or aspects, the multi-pass flow through reactor 304 of the system 302 also includes an adsorption zone 312c, a first unaerated zone 314c downstream of the adsorption zone 312c, a first aerated zone 316c downstream of the first unaerated zone 314c, a second unaerated zone 317c downstream of the first aerated zone 316c, and a second aerated zone 319c downstream of the second unaerated zone 317c. While there is certain utility in reconfiguring or retrofitting existing reactors, the multi-pass flow through reactor 304 of the system 302 can be implemented in a newly constructed reactor as well.

At least the adsorption zone 312a of the first pass 306, of the multi-pass flow through reactor 304 of the system 302, can begin operation with AGS granules 318 contained therein. The AGS granules 318 can be returned to at least the adsorption zone 312a of the first pass 306 from a selector zone 324 and exposed to wastewater in a manner that promotes rapid adsorption of pollutants, including nutrients and soluble BOD uptake into the AGS granules 318. A mixing device 330 can be turned on or off to suspend the AGS granules 318 in the wastewater or settle the granules at the bottom of each adsorption zone 312a-c of the multi-pass flow through reactor 304 for improved adsorption. Wastewater having a high pollutant, nutrient, and/or BOD content can be introduced into the adsorption zone 312a of the first pass 306 through a wastewater distribution system 320. The wastewater distribution system 320 may include an inlet pipe, a piping distribution network, an underdrain system at the bottom of the adsorption zone, a step feed channel 322, or other wastewater feed apparatuses or methods that promote rapid pollutant adsorption into the AGS granules 318. As the wastewater comes into contact with the AGS granules 318, pollutants are adsorbed into the AGS granules 318. This represents the "feast" stage of the required "feast and famine" cycle referenced above. Once pollutants are adsorbed, pollutants penetrate through the AGS granules 318 where they are converted and used by the biomass in the different layers of the individual AGS granules 318. Each layer of the individual AGS granules 318 can change the character of the nutrients and make the nutrients usable as a substrate for the next layer of biomass that is deeper in the individual AGS granules 318. This process continues deeper and deeper into the individual AGS granules 318, starting with aerobic conditions on the outside of the individual AGS granules 318 and proceeding into anoxic and then anaerobic conditions as penetration into the individual AGS granules 318 continues.

The wastewater distribution system 320 can create even distribution of raw wastewater through the settled AGS granules 318. The even distribution of raw wastewater can be accomplished by using an inlet pipe, a piping distribution network, an underdrain system at the bottom of each adsorption zone 312a-c, a step feed channel 322, or other wastewater feed apparatuses or methods. The inlet pipe, piping distribution network, underdrain system at the bottom of each adsorption zone 312, or step feed channel 322 can receive the influent wastewater from a wastewater feed pipe or channel and can create an even distribution of wastewater at the bottom of the reactor evenly distributed across the entire bottom surface of the reactor, thereby creating complete contact of wastewater with the AGS granules 318. In a typical SBR, this adsorption cycle is generally unaerated and the mixing is turned off so that granules are settled to the bottom of the reactor. However, in some non-limiting embodiments or aspects shown in FIG. 3, a mixing device 330 within the each adsorption zone 312a-c can be turned off and on periodically. Operating the mixing device 330 during the adsorption period allows the granules and wastewater in each adsorption zone 312a-c to move on to the next reactor zone or pass and subsequently continuously flow through the entire multi-pass flow through reactor 304 of the system 302. Flow of wastewater and granules between zones can occur when, for example, the wastewater and granules flow underneath, around, or over the top of the baffle walls 328 separating each zone, or through openings in the baffle walls 328.

As mentioned above, some non-limiting embodiments or aspects of the multi-pass flow through reactor 304 of the system 302 shown in FIG. 3 are intended to provide the required physical and environmental conditions for development and maintenance of AGS granules 318 similar to the cycles of an SBR. The first pass 306 is followed by a second pass 308 located downstream of the first pass 306. A third pass 310 is located downstream of the second pass 308. Subsequent passes may also be included. FIG. 3 depicts the passes as being disposed in parallel with one another since this configuration is more compact and consistent with the layout of conventional or BNR activated sludge aeration basins reactors which can be retrofit with the system of the present disclosure. However, the passes can be positioned in other configurations as well (e.g., the end of the first pass abuts the beginning of the second pass). Each of the first pass 306, the second pass 308, and the third pass 310 can include an adsorption zone 312a-c, a first unaerated zone 314a-c downstream of the adsorption zone 312a-c, a first aerated zone 316a-c downstream of the first unaerated zone 314a-c, a second unaerated zone 317a-c downstream of the first aerated zone 316a-c, and a second aerated zone 319a-c downstream of the second unaerated zone 317a-c. While each "pass" is generally considered to include a set of zones including at least one adsorption zone, at least one aerated zone, and at least one unaerated zone, in some non-limiting embodiments, the second, third, and/or subsequent pass(es) may not include an adsorption zone. Each unaerated zone 314a-c, 317a-c is under anaerobic, anoxic, or both anaerobic and anoxic conditions. Each aerated zone 316a-c, 319a-c is under aerobic conditions. The sequence of each pass can include an adsorption zone 312a-c, a first unaerated zone 314a-c downstream of the adsorption zone 312a-c, a first aerated zone 316a-c downstream of the first unaerated zone 314a-c, a second unaerated zone 317a-c downstream of the first aerated zone 316a-c, and a second aerated zone 319a-c downstream of the second unaerated zone 317a-c., and this sequence can act to deplete the substrate creating the "famine" stage of the "feast and famine" cycle referenced above. The sizes of each zone can be modified and refined to allow for appropriate cycle times under each of the required physical and environmental conditions. For example, the aerated zones 316a-c, 319a-c of each pass can be larger to create a longer aerated cycle time to ensure that the remaining substrate is used by the bacteria causing the bacteria to enter the "famine" stage due to the absence of remaining substrate to consume. Causing the bacteria to enter the "famine" stage helps promote AGS granules 318 with specialized layers of bacteria. In addition, while FIG. 3 illustrates each pass with one aerated zone and one unaerated zone, each pass may contain more than one aerated zone and more than one unaerated zone, such as two of each zone, three of each zone, four of each zone, or more than four of each zone, where the unaerated and aerated zones may alternate. The number of aerated and unaerated zones does not need to be the same within each pass or across different passes. For example, the first pass may include two aerated zones and one unaerated zones while the second pass can include one aerated zone and two unaerated zones.

As mentioned above, the adsorption zone 312a-c of each pass can be outfitted with a mixing device 330. The type of mixing device 330 is not limited to any particular embodiments or aspects. Possible mixing device 330 configurations include mechanical bladed mixers, impellor mixers, hydraulic mixers, large bubble mixers, or any other form of mixer that is typically used for mixing of zones in a BNR aeration basin. The unaerated zones 314a-c, 317a-c of each pass can also include a mixing device 330, and each mixing device 330 could be operated in an on/off cycle or could run continuously. Each mixing device 330 can suspend the AGS granules 318 within the wastewater so the AGS granules 318 can flow to the next zone and can create an up and down movement within the water column of the zone wherein the AGS granules 318 can attract and retain floc and build the dense and highly spherical shape.

The multi-pass flow through reactor 304 of the system 302 can include aerated zones 316a-c, 319a-c in each pass. Each aerated zone 316a-c, 319a-c can be configured like standard aerobic zones that would be found in any activated sludge or biological nutrient removal (BNR) system. Each aerated zone 316a-c, 319a-c can use any known type of aeration device 332 commonly used in those systems, including, for example, a sparger aerator, a coarse bubble aeration system, a fine bubble aeration system, or a surface aeration system. Each aeration device 332 or feed valve to aeration grids may be capable of cycling on and off or it may run continuously. There may be a benefit in cycling the air on and off to create additional transient anoxia conditions.

Figure 4:
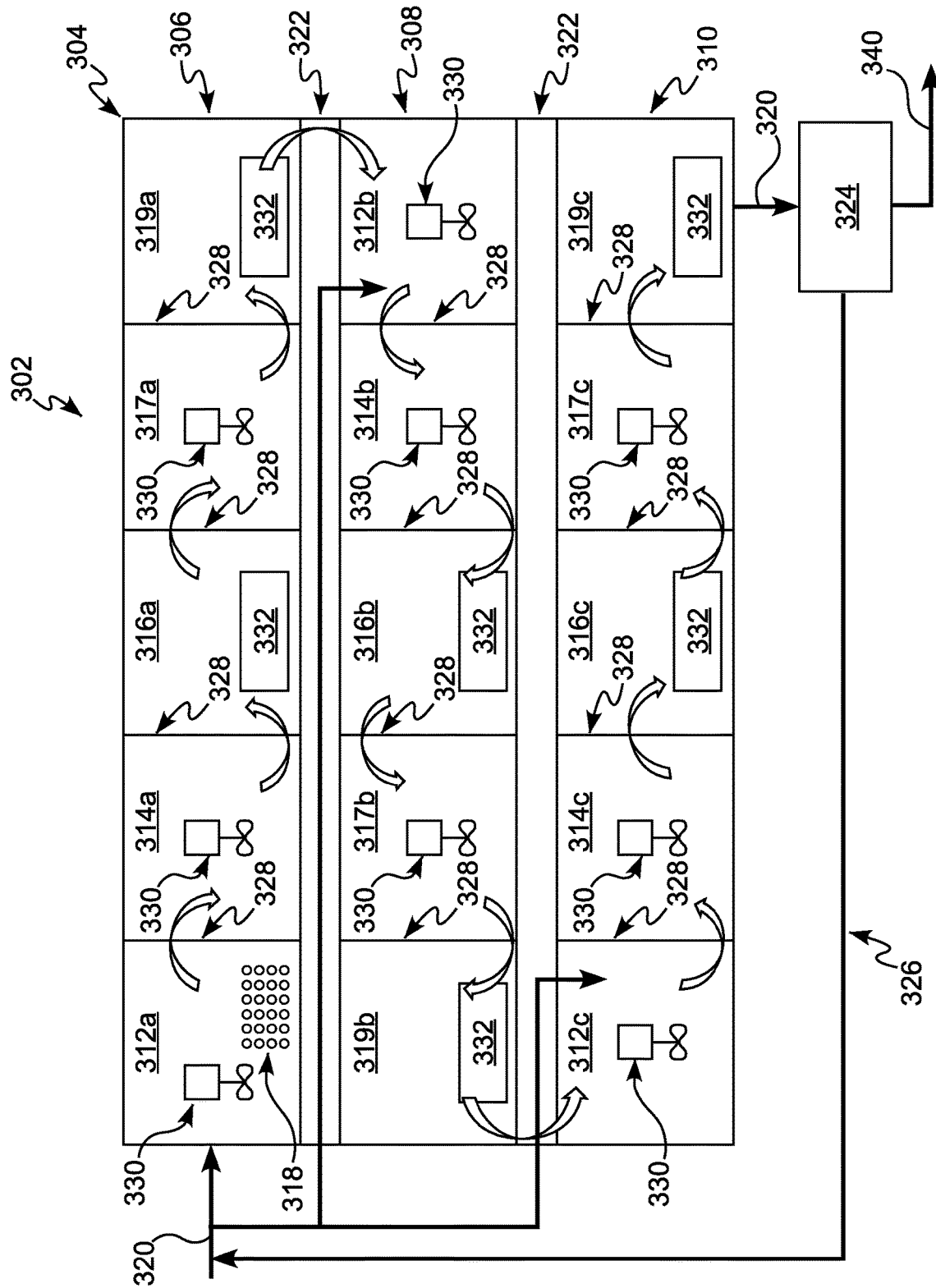
FIG. 4 is a non-limiting process flow view of the flow through aerobic granular sludge (AGS) system for treating wastewater of FIG. 3.

The multi-pass flow through reactor 304 of the system 302 can include a selector zone 324, which could use high-rate heavy solids removal and/or high rate clarification (such as through the use of HeadCells), as described in PCT Publication No. WO 2019/046416, which is incorporated herein by reference, or other grit removal system(s), positioned downstream of the second aerated zone 319c of the third pass 310 (or another pass if more than three passes are included) that can allow heavy particles to settle out and lighter particles to continue on downstream either to an existing or new clarifier (e.g., circular, rectangular, high rate, or other type of clarifier) or filtration system (e.g., cloth filter, multimedia filter, membrane, or other type of filter). Other grit removal systems include stacked tray grit removal systems, aerated grit removal units, vortex type grit removal units, plate or tube settler solids removal units, or cyclone type grit removal units. In some non-limiting embodiments or aspects, heavier granules can be recovered and passed through a return AGS pumping system 326, where they can be added back into the adsorption zone 312a-c of the first pass 306, the second pass 308, and/or the third pass 310. AGS granules 318 can be returned to one or more of the adsorption zones 312a-c by, for example, dispensing the AGS granules 318 into the wastewater stream that is fed into adsorption zone(s) 312a-c (such as the adsorption zone of the first pass 312a as depicted in FIGS. 3-4) or AGS granules 318 can be returned to the adsorption zone(s) 312a-c by feeding AGS granules 318 from AGS pumping system 326 directly into the adsorption zone(s) 312a-c. The granule selection and recovery process can involve allowing the heavier granules to drop onto trays, transferring them to a center column, and then pumping them out of the underflow portion of the center column through the return AGS pumping system 326. The selector zone 324 can be configured to allow lighter biomass floc to pass through the selector zone 324 and out of the flow through reactor 304 in a treated wastewater stream 340 to existing or new downstream liquids/solids separation processes such as conventional secondary or final clarifiers, high rate clarifiers, grit removal technologies, filtration systems including, for example, media filtration, cloth filtration, or membrane filtration. Alternatively, selector zone 324 can separate lighter biomass floc from the liquid phase so that treated wastewater stream 340 contains only limited amounts of the lighter biomass floc.

The multi-pass flow through reactor 304 of the system 302 can include baffle walls 328 separating each zone and/or each pass. The baffle walls 328 can be constructed of any suitable material and are commonly concrete, wood, fiberglass, steel, or fabric curtains, etc. In addition, alternating aerated and unaerated zones can also be created without hard baffle walls by alternating zones with aeration grids and without aeration grids, or by turning aeration on and off in alternating aeration grids within a single zone. In FIG. 3, the multi-pass flow through reactor 304 of the system 302 includes baffle walls 328 separating each zone of each pass. The number, placement, and orientation of the baffle walls 328 are not limited to those shown in some non-limiting embodiments or aspects and fewer or more baffle walls could be utilized in the multi-pass flow through reactor 304 of the system 302. The addition of baffle walls 328 in a particular pass could allow for more zones to provide additional aerated and unaerated sequences.

With continued reference to FIG. 3, each adsorption zone 312a-c of each pass can repeat the process described above of receiving a raw wastewater feed and distributing that wastewater feed evenly throughout the adsorption zone. In some non-limiting embodiments or aspects, wastewater can enter the adsorption zone 312a-c without the aid of a bottom flow distribution network. In some non-limiting embodiments or aspects, a step feed channel 322, or some other piping configuration, can be used to feed raw wastewater into the adsorption zone 312b and 312c of the second pass 308 and the third pass 310, respectively. In addition to this raw wastewater feed, the adsorption zone 312b of the second pass 308 also receives the "famine" granules and wastewater that exit the first pass 306. Like in the adsorption zone 312a of the first pass 306, the AGS granules 318 that enter the adsorption zone 312b of the second pass 308 can settle to the bottom of the zone and rapidly adsorb pollutants, nutrients, and soluble BOD in the wastewater. Similarly, the adsorption zone 312c of the third pass 310 can receive a raw wastewater feed along with famine AGS granules 318 and wastewater exiting the second pass 308. Within the adsorption zone 312c of third pass 310, these AGS granules 318 can settle to the bottom of the zone and rapidly adsorb nutrients in the raw wastewater. Multiple adsorption zones 312a-c can help maintain the growth and continued development of the AGS granules 318 by providing multiple "feast and famine" cycles within the multi-pass flow through reactor 304.

The multi-pass flow through reactor 304 of the system 302 can include a step feed channel 322, or some other piping configuration, to feed raw wastewater into the adsorption zone 312b and 312c of the second pass 308 and the third pass 310, as well as any subsequent passes. The step feed channel 322 can include a step feed operation in which the amount or ratio of raw wastewater fed into each adsorption zone is variable and optimized. The step feed operation can include an appropriate amount of wastewater fed into the adsorption zone 312b of the second pass 308 relative to the amount of wastewater fed to the adsorption zone 312a of the first pass 306, and a subsequent amount of wastewater fed into the adsorption zone 312c of the third pass 310 relative to the wastewater fed to the adsorption zone 312b of the second pass 308. For example, the first pass 306 can be provided with the highest amount of raw wastewater since raw wastewater entering the first pass 306 will have the longest contact time with the AGS granules 318, thus a higher amount of pollutant removal. To vary the loads to each adsorption zone 312a-c based on contact time, in this example, the amount of influent wastewater is reduced in each subsequent pass.

Referring to FIG. 4, there is shown a process flow pattern of a flow through aerobic granular sludge (AGS) system 302 for treating wastewater incorporated into an existing or a new multi-pass flow through reactor 304. FIG. 4 illustrates one potential flow pattern through each zone and each pass in the multi-pass flow through reactor 304 of the system 302 of FIG. 3. In some non-limiting embodiments or aspects, the flow pattern is serpentine and passes alternatively above and below the baffle walls 328. However, the flow path need not be serpentine and can be adjusted by reconfiguring the baffle walls 328 and the wastewater distribution system 320. Wastewater containing suspended AGS granules 318 can flow from the second aerated zone 319a of the first pass 306 to the adsorption zone 312b of the second pass 308. Some raw wastewater can also be fed to the adsorption zone 312b of the second pass 308 through the wastewater distribution system 320, the step feed channel 322, and/or some other piping configuration. Wastewater containing suspended AGS granules 318 can also flow from the second aerated zone 319b of the second pass 308 to the adsorption zone 312c of the third pass 310. Some raw wastewater can also be fed to the adsorption zone 312c of the third pass 310 through the wastewater distribution system 320, the step feed channel 322, and/or some other piping configuration. In some non-limiting embodiments or aspects, there is also shown a process flow of the step feed channel 322, or some other piping configuration, which is used to feed raw wastewater into the adsorption zone 312b and 312c of the second pass 308 and the third pass 310, respectively. This sequence of zones and passes seeks to maintain the AGS granules 318 all the way through the multi-pass flow through reactor 304 by creating the desired physical and environmental conditions including: rapid adsorption of pollutants, the "feast and famine" cycle, movement of AGS granules 318 up and down in the water column, and selection of dense granules to retain in the multi-pass flow through reactor 304, as found in an SBR.

Also provided is a method of treating wastewater. The method can be implemented in, for example, the flow through reactor of FIG. 2 or the multi-pass flow through reactor of FIG. 3. The method can include a first step of introducing wastewater into the reactor 204, 304, such as into an adsorption zone 206, 312a-c of the reactor that also includes AGS granules 208, 318. The method can also include distributing, such as by allowing to flow or causing to flow, the wastewater and at least a portion of the AGS granules 208, 318 through the various reactor zones (e.g., zones 210, 212, 214, 216 of reactor 204 or zones 312a-c, 314a-c, 316a-c, 317a-c, 319a-c of reactor 304). If the method is implemented in a multi-pass reactor 304, the method can include distributing the wastewater and AGS granules from the first pass 306 (after passing through each zone of the first pass 306) into the second pass 308, and from the second pass 308 (after passing through each zone of the second pass 308) into the third pass 310. If a fourth or subsequent pass is included, the wastewater and AGS granules can pass through these subsequent passes as well. The wastewater and AGS granules 208, 318 can eventually arrive at a selector zone 220, 324, where the AGS granules 208, 318 can be removed, recycled, and/or reused, such as by reintroducing the AGS granules 208, 318 to an adsorption zone (e.g., zone 206 or 312a-c). The treated wastewater arriving at the selector zone 220, 324 can then be passed along to subsequent processing, such as gravity clarification, filtration, or other downstream treatment techniques, or it can be introduced into the water supply.

Although the flow through aerobic granular sludge (AGS) system and method for treating wastewater has been described in detail for the purpose of illustration based on what is currently considered to be some non-limiting embodiments or aspects, it is to be understood that such detail is solely for that purpose and that the system and method is not limited to the disclosed non-limiting embodiments or aspects, but, on the contrary, is intended to cover modifications and equivalent arrangements. For example, it is to be understood that the present system and method contemplates that, to the extent possible, one or more features of some non-limiting embodiments or aspects can be combined with one or more features of any other non-limiting embodiments or aspects.

What is claimed is:

1. A flow through aerobic granular sludge (AGS) system for treating wastewater comprising: a multi-pass flow through reactor comprising a first pass, a second pass downstream of the first pass, and a third pass downstream of the second pass, wherein each of the first pass, the second pass, and the third pass comprises an adsorption zone, an unaerated zone downstream of the adsorption zone, and an aerated zone downstream of the unaerated zone, and wherein at least the adsorption zone of the first pass includes AGS granules; a selector zone located downstream of the third pass, the selector zone configured to remove the AGS granules from the wastewater; and a return AGS pumping system in communication with the selector zone, the return AGS pumping system configured to transport the AGS granules removed from the wastewater in the selector zone to the adsorption zone of at least one of the following: the first pass, the second pass, the third pass, or any combination thereof, wherein the multi-pass flow through reactor is configured such that, at all stages of operation, the wastewater and AGS granules flow continuously and sequentially from the first pass to the second pass and from the second pass to the third pass.

2. The flow through aerobic granular sludge (AGS) system for treating wastewater of claim 1, wherein the multi-pass flow through reactor further comprises:
a wastewater distribution system configured to introduce wastewater to at least the adsorption zone of the first pass.

3. The flow through aerobic granular sludge (AGS) system for treating wastewater of claim 2, wherein the multi-pass flow through reactor further comprises:
a step feed channel configured to feed wastewater into the adsorption zone of each of the second pass and the third pass.

4. The flow through aerobic granular sludge (AGS) system for treating wastewater of claim 1, wherein each of the first pass, the second pass, and the third pass comprises a plurality of unaerated zones and a plurality of aerated zones.

5. A method of treating wastewater using a multi-pass flow through aerobic granular sludge (AGS) reactor, wherein the multi-pass flow through AGS reactor comprises a first pass, a second pass downstream of the first pass, and a third pass downstream of the second pass, wherein each of the first pass, the second pass, and the third pass comprises an adsorption zone, an unaerated zone downstream of the adsorption zone, and an aerated zone downstream of the unaerated zone, and wherein at least the adsorption zone of the first pass includes AGS granules, the method comprising: introducing wastewater to the adsorption zone of the first pass; causing the wastewater and the AGS granules to continuously and sequentially flow at all stages of operation of the multi-pass flow through AGS reactor from the first pass to the second pass and from the second pass to the third pass; distributing the wastewater and at least a portion of the AGS granules to a selector zone located downstream of the third pass; and returning the AGS granules removed from the wastewater to the adsorption zone of at least one of the following: the first pass, the second pass, the third pass, or any combination thereof.

\* \* \* \* \*